United States Patent
Glebov et al.

(10) Patent No.: US 11,104,353 B2
(45) Date of Patent: Aug. 31, 2021

(54) COMPUTING SYSTEM WITH AUTONOMOUS OPERATION MECHANISM AND METHOD OF OPERATION THEREOF

(71) Applicant: Telenav, Inc., Santa Clara, CA (US)

(72) Inventors: Alexander G. Glebov, San Jose, CA (US); Kok Wei Koh, Mountain View, CA (US); Manuj Shinkar, Sunnyvale, CA (US); Gregory Stewart Aist, Santa Clara, CA (US); HaiPing Jin, Saratoga, CA (US); Sarvesh Bansilal Devi, Milpitas, CA (US); Shalu Grover, Sunnyvale, CA (US); Jinghai Ren, Milpitas, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 438 days.

(21) Appl. No.: 15/860,523

(22) Filed: Jan. 2, 2018

(65) Prior Publication Data
US 2019/0202470 A1 Jul. 4, 2019

(51) Int. Cl.
*B60W 50/08* (2020.01)
*B60W 40/09* (2012.01)
(Continued)

(52) U.S. Cl.
CPC ......... *B60W 50/085* (2013.01); *B60R 16/037* (2013.01); *B60W 40/09* (2013.01);
(Continued)

(58) Field of Classification Search
CPC .. B60W 50/085; B60W 50/045; B60W 40/09; B60W 10/20; B60W 2050/0075;
(Continued)

(56) References Cited

U.S. PATENT DOCUMENTS

| | | | |
|---|---|---|---|
| 8,676,427 B1 * | 3/2014 | Ferguson ............ | B60W 10/20 701/23 |
| 2016/0026182 A1 * | 1/2016 | Boroditsky .......... | G08G 1/0145 701/23 |
| 2017/0032673 A1 * | 2/2017 | Scofield ............... | G08G 1/0962 |

FOREIGN PATENT DOCUMENTS

WO  WO-2015134421 A1 * 9/2015 ........... A61B 5/0476

OTHER PUBLICATIONS

ScienceDaily, Do passengers prefer autonomous vehicles driven like machines or like humans?, University of Warwick, Jul. 8, 2019 (Year: 2019).*

\* cited by examiner

*Primary Examiner* — Thomas Ingram
(74) *Attorney, Agent, or Firm* — Perspectives Law Group, Corp.

(57) ABSTRACT

A computing system includes: a control unit, coupled to the communication unit, configured to: monitor a current vehicle operation measure for an essential vehicle control function of a user vehicle in an autonomous vehicle operation state; calculate an operation measure modification factor based on a vehicle operation profile of the user vehicle; calculate a modified model input from the current vehicle operation measure based on the operation measure modification factor; generate a vehicle operation instruction, with the modified model input, for the essential vehicle control function according to a vehicle operation model to operate the essential vehicle control function of the user vehicle in the autonomous vehicle operation state; and a communication unit configured to provide the vehicle operation instruction to an autonomous vehicle operation system.

20 Claims, 5 Drawing Sheets

(51) Int. Cl.
*B60W 50/04* (2006.01)
*B60R 16/037* (2006.01)
*B60W 10/06* (2006.01)
*B60W 10/18* (2012.01)
*B60W 50/00* (2006.01)
*B60W 10/20* (2006.01)

(52) U.S. Cl.
CPC ........... *B60W 50/045* (2013.01); *B60W 10/06* (2013.01); *B60W 10/18* (2013.01); *B60W 10/20* (2013.01); *B60W 2050/0075* (2013.01); *B60W 2540/30* (2013.01)

(58) Field of Classification Search
CPC .. B60W 10/18; B60W 10/06; B60W 2540/30; B60W 2530/14; B60W 2556/45
See application file for complete search history.

COMPUTING SYSTEM WITH AUTONOMOUS OPERATION MECHANISM AND METHOD OF OPERATION THEREOF

TECHNICAL FIELD

An embodiment of the present invention relates generally to a computing system, and more particularly to a system for autonomous vehicle operation.

BACKGROUND

Modern consumer and industrial electronics, especially devices such as graphical computing systems, stand-alone or vehicle integrated navigation and computing systems, guided computing system, autonomous functions for vehicles, and self-driving cars, are providing increasing levels of functionality to support modern life including navigation and route guidance services. Research and development in the existing technologies can take a myriad of different directions.

As users become more empowered with the growth of navigation devices, vehicle based navigation services, and vehicle automation, new and old paradigms begin to take advantage of this new device space. There are many technological solutions to take advantage of this new device capability to enhance or augment navigation and route guidance. However, users are often not provided with options for modifying the operation of autonomous or self-driving vehicles.

Thus, a need still remains for a computing system with an operation modification mechanism for autonomous vehicle operation. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a control unit, coupled to the communication unit, configured to: monitor a current vehicle operation measure for an essential vehicle control function of a user vehicle in an autonomous vehicle operation state; calculate an operation measure modification factor based on a vehicle operation profile of the user vehicle; calculate a modified model input from the current vehicle operation measure based on the operation measure modification factor; generate a vehicle operation instruction, with the modified model input, for the essential vehicle operation functions according to a vehicle operation model to operate the essential vehicle control functions of the user vehicle in the autonomous vehicle operation state; and a communication unit configured to provide vehicle operation instructions to an autonomous vehicle operation system.

An embodiment of the present invention provides a method of operation of a computing system including: monitoring a current vehicle operation measure for an essential vehicle control function of a user vehicle in an autonomous vehicle operation state; calculating an operation measure modification factor based on a vehicle operation profile of the user vehicle; calculating a modified model input from the current vehicle operation measure based on the operation measure modification factor; and generating a vehicle operation instruction, with the modified model input, for the essential vehicle operation functions according to a vehicle operation model to operate the essential vehicle control functions of the user vehicle in the autonomous vehicle operation state.

An embodiment of the present invention provides a non-transitory computer readable medium including instructions executable by a control circuit for a computing system, the instructions including: monitoring a current vehicle operation measure for an essential vehicle control function of a user vehicle in an autonomous vehicle operation state; calculating an operation measure modification factor based on a vehicle operation profile of the user vehicle; calculating a modified model input from the current vehicle operation measure based on the operation measure modification factor; and generating a vehicle operation instruction, with the modified model input, for the essential vehicle operation functions according to a vehicle operation model to operate the essential vehicle control functions of the user vehicle in the autonomous vehicle operation state.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Figure 1:
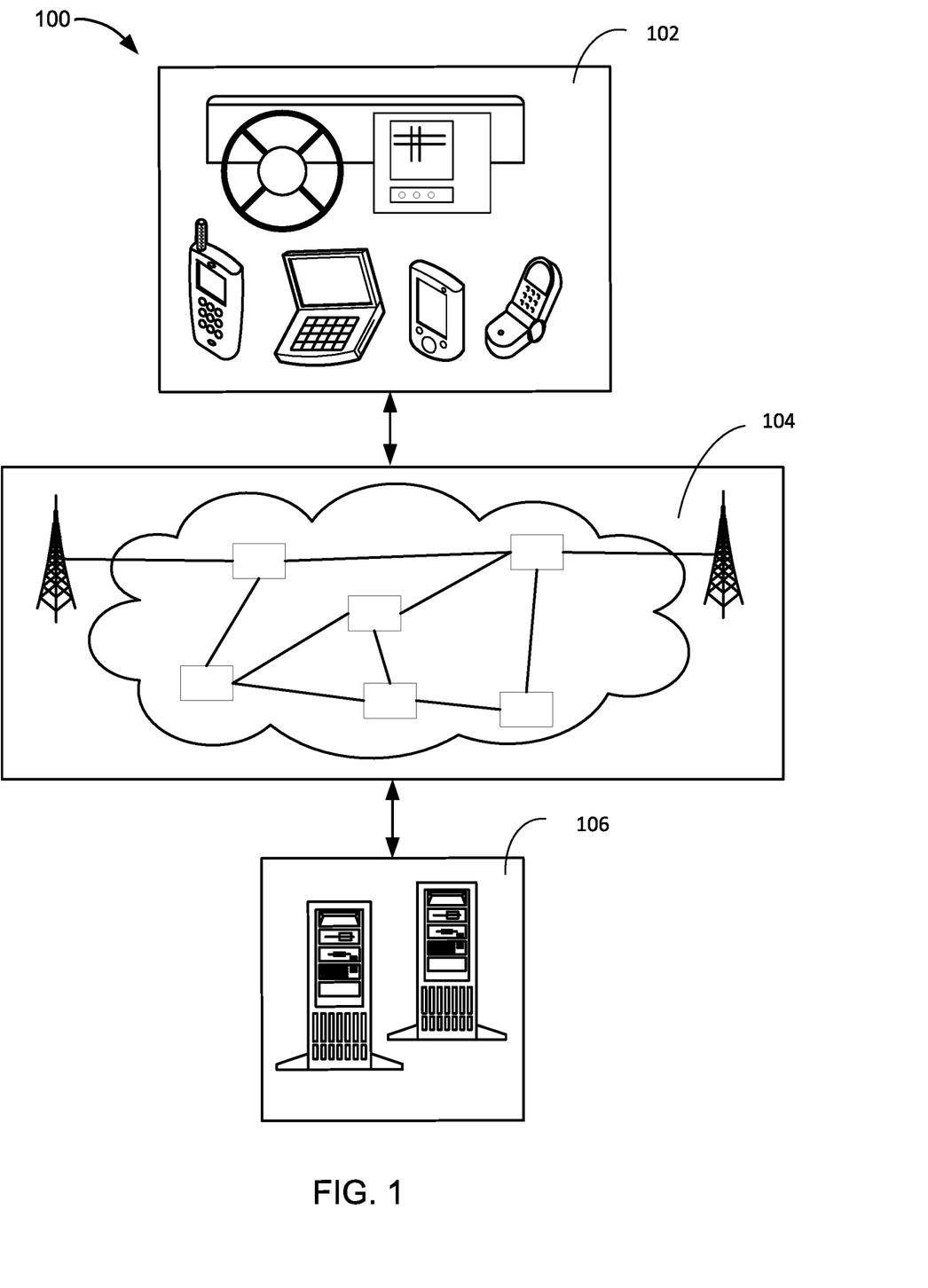
FIG. 1 is a computing system with operation modification mechanism for an autonomous vehicle in an embodiment of the present invention.

Referring now to FIG. 1, therein is shown a computing system 100 with operation modification mechanism for an autonomous vehicle in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded computing system or computing device. The first device 102 can couple, either directly or indirectly, to the communication path 104 to communicate with the second device 106 or can be a stand-alone device.

The second device 106 can be any of a variety of centralized or decentralized computing devices, or sensor instrument or devices to take measurements or record environmental information. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
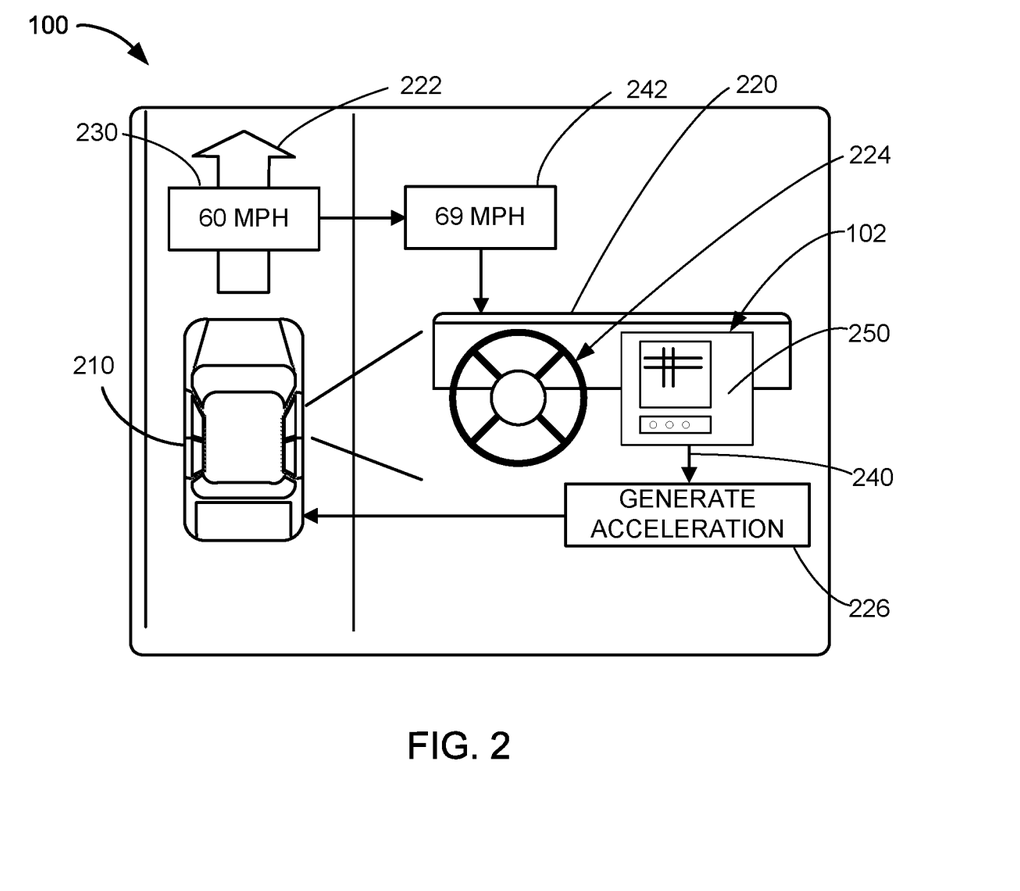
FIG. 2 is an example of a user vehicle associated with the computing system.

Referring now to FIG. 2, therein is shown a depiction of a user vehicle 210 associated with the computing system 100. The user vehicle 210 can be a self-propelled road or off-road motorized vehicle. More specifically, the user vehicle 210 can be a passenger vehicle powered by electric power, petroleum based fuel, or a hybrid thereof and generally excludes vehicles that operate on rails, such as trains or cable cars. Examples of the user vehicle 210 can include cars, trucks, buses, and vans.

The user vehicle 210 can include an autonomous vehicle operation system 220. The autonomous vehicle operation system 220 is a system that performs various functions and operations for autonomous control and operation of the user vehicle 210. For example, the autonomous vehicle operation system 220 can perform functions for autonomous driving of the user vehicle 210 and other related operations while in an autonomous vehicle operation state 222. The autonomous vehicle operation state 222 is a state where the autonomous vehicle operation system 220 has control over one or more essential vehicle control functions 224 of the user vehicle 210 to engage in partial or fully autonomous operation of the user vehicle 210.

The essential vehicle control functions 224 are functions for driving the user vehicle 210. For example, the essential vehicle control functions 224 can include braking control functions, steering control functions, throttling control functions, or a combination thereof. The autonomous vehicle operation system 220 can operate the user vehicle 210 through control and operation of the essential vehicle control functions 224.

The autonomous vehicle operation system 220 can generate vehicle operation instructions 226 to control the essential vehicle control functions 224. For example, vehicle operation instructions 226 can be commands to manipulate mechanical and electronic systems in the user vehicle 210 in order to execute driving maneuvers, such as distance control, speed control, acceleration, braking, or turning.

The autonomous vehicle operation system 220 can monitor current vehicle operation measures 230 of the essential vehicle control functions 224. The current vehicle operation measures 230 are real time measurements of the vehicle control functions. For illustrative purposes, one of the current vehicle operation measures 230 is depicted as a measurement of speed of the user vehicle 210, although it is understood that the current vehicle operation measures 230 can be measurements of other systems. For example, another instances of the current vehicle operation measures 230 can include a measurement of the follow distance or spacing between the user vehicle 210 and surrounding vehicles, the rate of acceleration or deceleration of the user vehicle 210, steering wheel angle or rotation rate of the user vehicle 210 during a turn, or a combination thereof.

The autonomous vehicle operation system 220 can generate the vehicle operation instructions 226 to autonomously operate the user vehicle 210 based on a vehicle operation model 240. The vehicle operation model 240 is a model for emulating the operation pattern or behavior of a vehicle operator. More specifically, the vehicle operation model 240 can be a model to emulate the driving patterns and habits of a vehicle occupant (not shown) when the vehicle occupant is performing driving maneuvers during manual operation of the user vehicle 210. For example, the vehicle operation model 240 can model how the vehicle occupant accelerates after a stop or performs turns, the speed at which the vehicle occupant prefers to maintain, and other types of vehicle operation behaviors. The vehicle operation model 240 can also factor in situations or conditions during manual operation of the user vehicle 210 by the vehicle occupant, such as weather, traffic, or the number and identity of passengers in the user vehicle. Details of the vehicle operation model 240 will be discussed below.

In general, the autonomous vehicle operation system 220 can implement or apply the vehicle operation model 240 to generate the vehicle operation instructions 226 based on the current vehicle operation measures 230. For example, the vehicle operation instructions 226 can include instructions to increase speed at an acceleration rate according to the vehicle operation model 240 when the current vehicle operation measures 230 indicates that the vehicle speed is lower than that in the vehicle operation model 240.

However, since the vehicle operation model 240 endeavors to emulate the operation patterns or behavior of the vehicle occupant when driving the user vehicle 210, there can be certain instances where the vehicle operation model 240 can include operation behavior or patterns that can be deemed unsafe or illegal. Instead of changing the vehicle operation model 240 to conform to safety or legal standards, the computing system 100 can provide a modified model input 242 corresponding to one or more of the current vehicle operation measures 230. The modified model input 242 is a modification to the current vehicle operation measures 230 to increase similarity of the current vehicle operation measures 230 to the operation patterns of the vehicle occupant during manual operation of the user vehicle 210. The modified model input 242 can be input into the vehicle operation model 240 instead of the current vehicle operation measures 230 to generate the vehicle operation instructions 226.

As an illustration, during manual operation of the user vehicle 210 on a highway, the vehicle occupant may typically maintain the speed of the user vehicle 210 with the current vehicle operation measures 230 of 75 miles per hour (MPH). To emulate the operation of the user vehicle 210 by the vehicle occupant in the autonomous vehicle operation state 222, the vehicle operation model 240 similarly would generate the vehicle operation instructions 226 to output the speed of the user vehicle 210 at 75 MPH. In order to comply with a posted speed limit of 65 miles per hour, it would be necessary to reduce the speed of the user vehicle to 65 MPH, which is in conflict with the vehicle operation model 240. To preserve the vehicle operation model 240, the computing system 100 can modify the current vehicle operation measures 230 by providing the modified model input 242 as an increased value relative to the current vehicle operation measures 230.

To continue the illustration, as a specific example, in the situation where the current vehicle operation measures 230 for the vehicle speed is 60 MPH, the computing system 100 can modify the current vehicle operation measures 230 to provide the modified model input 242 as a scaled value, calculated based on the vehicle operation model 240, of approximately 69 MPH. As a result, the autonomous vehicle operation system 220 can provide the vehicle operation instructions 226 to generate acceleration according to the vehicle operation model 240 until the current vehicle operation measures 230 of vehicle speed reaches 65 MPH and the modified model input 242 concurrently reaches 75 MPH. Details regarding the calculation of the modified model input 242 will be described in detail below.

The computing system 100 can include a system interface 250 which enables interaction between the vehicle occupant and the autonomous vehicle operation system 220. The system interface 250 can be a part of the first device 102 of FIG. 1 and can be implemented in a variety of forms. For example, the system interface 250 can be a physical system as part of an attached or embedded vehicle interface of the user vehicle 210, such as a dashboard interface or center console interface. In another example, the system interface 250 can be a part of a standalone device, such as a mobile device, a navigation device, mobile phone, or mobile computing device. In an implementation of the first device 102 that is integrated with the user vehicle 210, the system interface 250 can include a display interface, instrument panel with a touch screen, keypad, other interface components, or a combination thereof.

The first device 102 can be capable of implementing the autonomous vehicle operation system 220 and can provide all or portions of the functions described above. Each of the above described functions will be described in detail below.

Figure 3:
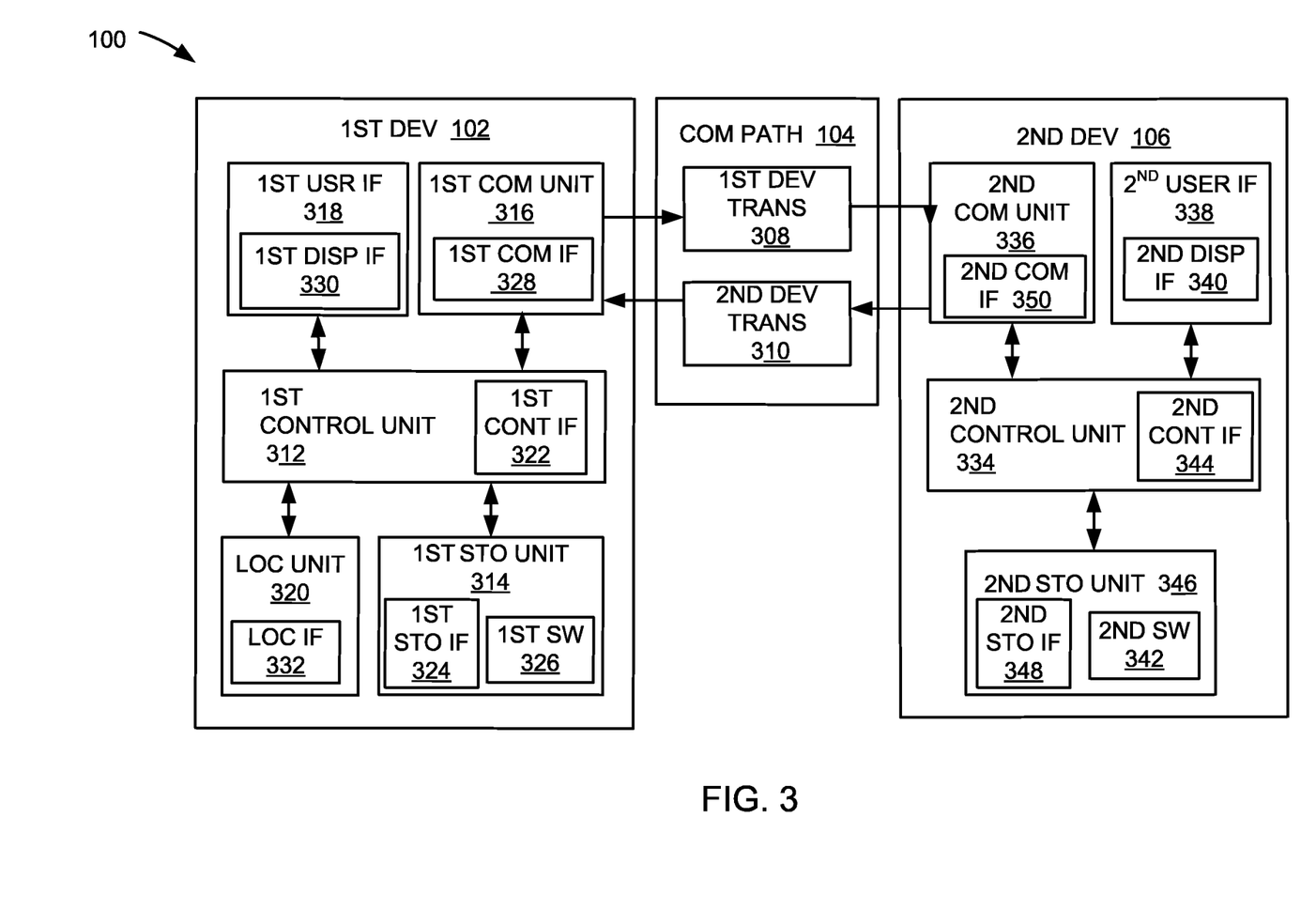
FIG. 3 is an exemplary block diagram of the computing system.

Referring now to FIG. 3, therein is shown an exemplary block diagram of the computing system 100. The computing system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information. For example, first storage unit 314 can store the current vehicle operation measures 230 of FIG. 2.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs. Examples of the output device display components, haptic feedback components, audio components such as a speaker, or a combination thereof.

The first user interface 318 can include a first display interface 330. The first display interface 330 can include a display, a projector, a video screen, or any combination thereof.

The first control unit 312 can operate the first user interface 318 to display information generated by the computing system 100. The first control unit 312 can also execute the first software 326 for the other functions of the computing system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340, haptic feedback components, audio components such as a speaker, or a combination thereof. The second display interface 340 can include a display, a projector, a video screen, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the current vehicle operation measures 230 of FIG. 2. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 4:
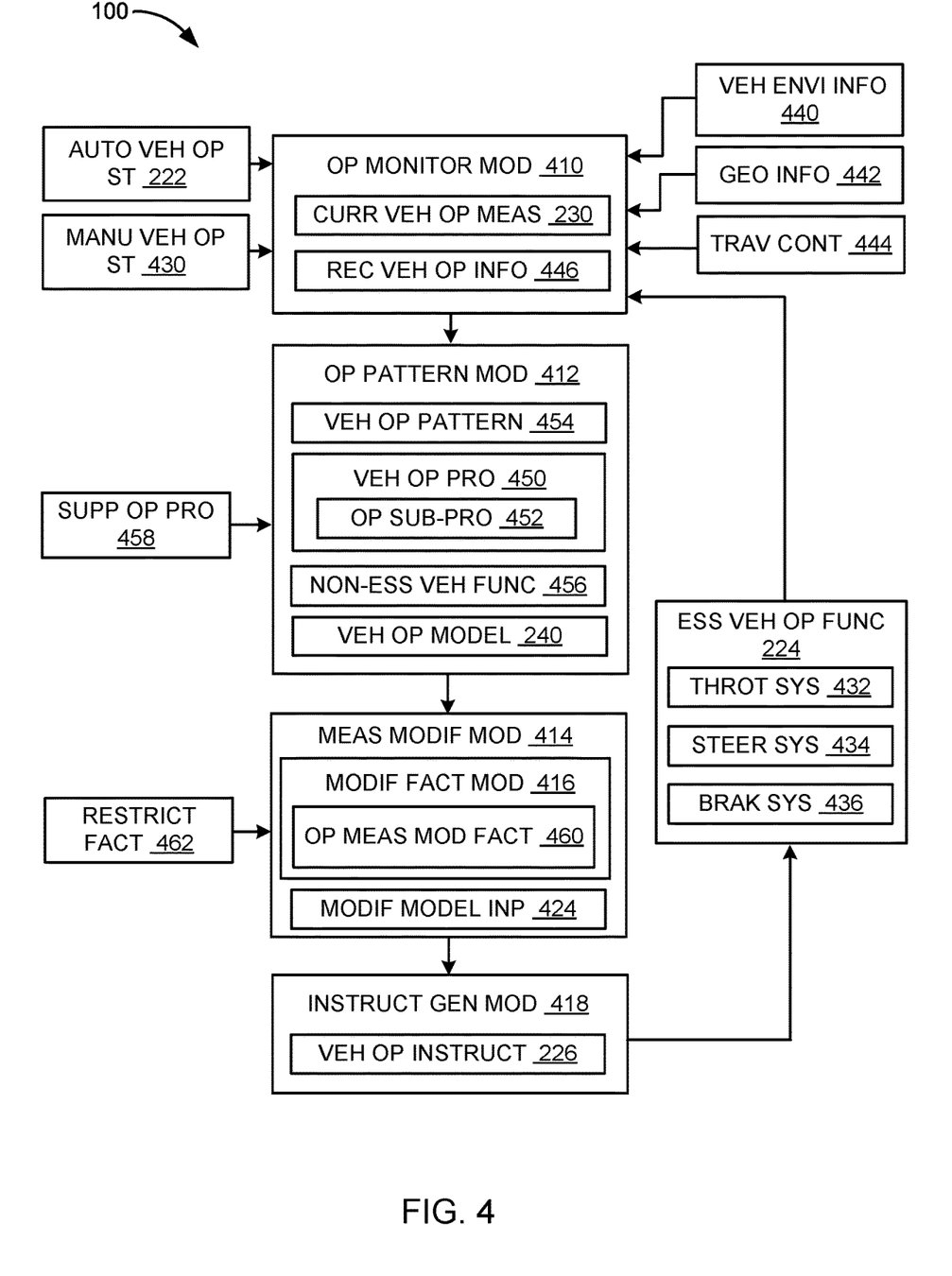
FIG. 4 is a control flow of the computing system.

Referring now to FIG. 4, therein is shown a control flow of the computing system 100. The computing system 100 can include an operation monitor module 410, an operation pattern module 412, a measure modification module 414, and an instruction generation module 418. The operation pattern module 412 can be coupled to the operation monitor module 410. The measure modification module 414 can be coupled to the operation pattern module 412. The instruction generation module 418 can be coupled to the measure modification module 414.

The operation monitor module 410 is for monitoring the operation functions of the user vehicle 210 of FIG. 2. The operation monitor module 410 can monitor and record the current vehicle operation measures 230 of the essential vehicle control functions 224. More specifically, the operation monitor module 410 can monitor the current vehicle operation measures 230 of the essential vehicle control functions 224 during a manual vehicle operation state 430, the autonomous vehicle operation state 222, or a combination thereof.

The manual vehicle operation state 430 is a state where the user vehicle 210 is operated by the vehicle occupant. More specifically, in the manual vehicle operation state 430, the vehicle occupant can drive the user vehicle 210 with the essential vehicle control functions 224, which can include a steering system 434, a throttling system 432, a braking system 436, or a combination thereof.

The steering system 434, the throttling system 432, and the braking system 436, can include the mechanical and electronic components within the user vehicle 210 to control turning and steering, acceleration, and braking of the user vehicle 210, respectively. For example, the essential vehicle control functions 224 can include direct or indirect control over the transmission system of the user vehicle 210. As a specific example, the throttling system 432 can be coupled with the transmission system to control of shift gears of the user vehicle. The operation monitor module 410 can monitor the current vehicle operation measures 230 by interfacing with each of the systems of the essential vehicle control functions 224.

In general, the operation monitor module 410 can monitor the current vehicle operation measures 230 for the essential vehicle control functions 224, including the steering system 434, the throttling system 432, the braking system 436, or a combination thereof. For example, the current vehicle operation measures 230 can include, but are not limited to, the speed of the user vehicle 210, the rate of acceleration of the user vehicle 210, the steering wheel angle or rotation rate of the steering wheel, the rate of deceleration when braking, and the amount of pressure applied to the brake pedal during braking.

In addition to monitoring the essential vehicle control functions 224, the operation monitor module can monitor, record, or a combination thereof vehicle environmental information 440, geographic information 442, a travel context 444, or a combination thereof. The vehicle environmental information 440 is information regarding the surrounding of the user vehicle 210 during operation of the user vehicle 210. The geographic information 442 is information about the geographic area around the user vehicle 210. The travel context 444 is information associated with traveling in the user vehicle 210.

Examples of the vehicle environmental information 440 can include information about stationary objects, such as road fixtures, signs, trees, or buildings. In another example, the vehicle environmental information 440 can include information about moving objects, such as vehicles, vehicle types, animals, or people. In a further example, the vehicle environmental information 440 can include road, weather, and lighting conditions.

The operation monitor module 410 can monitor the vehicle environmental information 440 in a number of ways. For example, the operation monitor module 410 can interface with sensors or instruments of the user vehicle 210, such as imagery sensors, radar systems, sonar systems, light detection and ranging (LIDAR) systems, sound capture devices, microphones, or a combination thereof.

Examples of the geographic information 442 can include information travel infrastructure, such as roads, highways, overpasses, railroad tracks and crossings, tunnels, and bridges. In another example, the geographic information 442 can include details about the road ways, including the number of lanes on the highway, one way streets, divided highways, lane mere sections, lane restrictions such as high occupancy or toll lanes, bicycle lanes, road conditions such as paved or unpaved roads, or any combination thereof. In a further example, the geographic information 442 can include locations and types of manmade structures, such as hospitals, homes, business parks, shopping malls, gas stations and other types of buildings. In yet a further example, the geographic information 442 can include information about geographic features, such as terrain, bodies of water, and topography; or a combination thereof.

Examples of the travel context 444 can include travel information, such as the current location of the user vehicle 210, a destination the user vehicle 210 is traveling towards, the date and time of day the user vehicle 210 is currently traveling, traffic conditions along a route the user vehicle 210 is traversing, or a combination thereof. In another example, the travel context 444 can include information about the loading or passengers in the user vehicle 210, such as the number of passengers in the user vehicle 210, the identity and relationships of the passengers in the user vehicle, whether the passengers are humans or animals, cargo or objects in the user vehicle 210, or a combination thereof. In a further example, the travel context 444 can include supplemental vehicle information, such as fuel level, battery life, or tire pressure.

The operation monitor module 410 can determine the geographic information 442, the travel context 444, or a combination thereof in a number of ways. For example, operation monitor module 410 can determine the geographic information 442 and the travel context 444 through communication or interfacing with other vehicles; sensors or detection instruments within the user vehicle 210 such as with the location unit 320 of FIG. 3; sources external to the user vehicle 210 or the first device 102, such as a database, a computer server, or a computer network; or a combination thereof. As a specific example, the first control unit 312 of FIG. 3 can implement the first communication unit 316 of FIG. 3 with the operation monitor module 410 to communicate with devices external to the first device 102, such the second communication unit 338 of FIG. 3 in the second device 106 of FIG. 1 surrounding vehicles or a traffic server.

In the manual vehicle operation state 430, the current vehicle operation measures 230, the vehicle environmental information 440, the travel context 444, or a combination thereof can be recorded and stored as a recorded vehicle operation information 446, for example, in the first storage unit 314 of FIG. 3, the second storage unit 346 of FIG. 3, or a combination thereof for further analysis and processing. For example, in the manual vehicle operation state 430, the operation monitor module 410 can pass, transmit, or transfer the vehicle environmental information 440, the travel context 444, or a combination thereof to the operation pattern module 412 to generate the vehicle operation model 240, which will be discussed below.

In the autonomous vehicle operation state 222, the current vehicle operation measures 230, the vehicle environmental information 440, the travel context 444, or a combination thereof can be used for autonomous operation of the user vehicle 210. For example, in the autonomous vehicle operation state 222, the operation monitor module 410 can pass, transmit, or transfer the vehicle environmental information 440, the travel context 444, or a combination thereof to the modification factor module 416, the instruction generation module 418, or a combination thereof to generate the vehicle operation instructions 226 for the user vehicle 210.

The control flow can pass from the operation monitor module 410 to the operation pattern module 412. The operation pattern module 412 is for generating the vehicle operation model 240 for operating the user vehicle 210 in the autonomous vehicle operation state 222. The operation pattern module 412 can generate the vehicle operation model 240 corresponding to a vehicle operation profile 450.

The vehicle operation profile 450 is a characterization of how the vehicle occupant operates the user vehicle 210 in the manual vehicle operation state 430. More specifically, the vehicle operation profile 450 can be a characterization of the style or driving preferences for operating the user vehicle 210.

The vehicle operation profile 450 can be determined based on the recorded vehicle operation information 446 while the vehicle occupant is operating the user vehicle 210 in the manual vehicle operation state 430. More specifically, the operation pattern module 412 can analyze the recorded vehicle operation information 446, vehicle environmental information 440, the geographic information 442, the travel context 444, or a combination thereof to determine a vehicle operation pattern 454 of the vehicle occupant.

The vehicle operation pattern 454 is a description of how the functions of the vehicle are controlled during driving or operation of the user vehicle 210. For example, the vehicle operation pattern 454 can be a description of how the vehicle occupant performs driving maneuvers through use of one or a combination of the essential vehicle control functions 224. Specific examples of the vehicle operation pattern 454 can include, but are not limited to descriptions of how the vehicle occupant accelerates the user vehicle 210 after a stop at a red light or stop sign; the rate at which the user vehicle 210 decelerates when coming to a stop, such as a complete stop at a stop sign or traffic signal, or a stop during operation of a user vehicle 210 in heavy traffic; the distance between the user vehicle 210 and an adjacent vehicle; the speed of the user vehicle 210 while traveling on a road or highway; or the turning radius, speed, braking and acceleration while performing a turning maneuver. In a further example, the vehicle operation pattern 454 can include a description of systems of the use vehicle 210 that are not directly controlled by the vehicle occupant, such as the transmission of the user vehicle 210, which can be linked to operation of the throttling system 432. More specifically, the operation pattern 454 can include when the transmission system changes gears, such as downshifting, in conjunction with the throttling system 432 when accelerating to pass another vehicle.

The operation pattern module 412 can generate one or more operation sub-profiles 452 of the vehicle operation profile 450 for the vehicle occupant under different circumstances and situations, which can be determined based on the geographic information 442, the travel context 444, or a combination thereof. As an example, the operation pattern module 412 can generate the operation sub-profiles 452 based on the vehicle operation pattern 454 for the vehicle occupant as the sole occupant and driver of the user vehicle 210. For instance, the vehicle operation pattern 454 can include the speed of the user vehicle 210 that regularly exceed the legal speed limit. As another example, the operation pattern module 412 can generate the operation sub-profiles 452 based on the vehicle operation pattern 454 for wet roads, which could include the cautious or conservative driving behavior relative to when driving in dry conditions, such as with lower speeds, gentler acceleration, smoother turns, or greater follow distance. Each of the operation sub-profiles 452 can have a corresponding instance of the vehicle operation model 240 specific to the vehicle operation pattern 454 of the operation sub-profiles 452.

The operation pattern module 412 can generate the vehicle operation model 240 to include operation of non-essential vehicle functions 456 during the manual vehicle operation state 430. The non-essential vehicle functions 456 are functions related or ancillary to driving of the user vehicle 210. More specifically, the non-essential vehicle functions 456 can be functions or systems that do not control the essential vehicle control functions 224 of user vehicle 210. For example, the non-essential vehicle functions 456 can include, but are not limited to, operation for wipers, headlights, high-beam head lights, or turn signals.

The operation pattern module 412 can generate the vehicle operation model 240 for the vehicle operation profile 450 in a number of ways. For example, the operation pattern module 412 can implement machine learning algorithms or techniques to generate the vehicle operation model 240 based the vehicle operation pattern 454. As a specific example, the operation pattern module 412 can implement a convolution neural network to calculate correlations between the recorded vehicle operation information 446 and the vehicle environmental information 440, the geographic information 442, the travel context 444, or a combination thereof.

Optionally, in the absence of the recorded vehicle operation information 446 corresponding to the manual vehicle operation state 430 for specific instances of the vehicle environmental information 440, the geographic information 442, the travel context 444, or a combination thereof, the operation pattern module 412 can generate the vehicle operation model 240 with a supplemental operation pattern 458. The supplemental operation pattern 458 is an operation pattern that is derived from sources other than the recorded vehicle operation information 446. For example, the supplemental operation pattern 458 can be a template generated by a third party or from a different driver with a similar instance of the vehicle operation profile 450, the same or similar type of the user vehicle 210, or a combination thereof.

The operation pattern module 412 can include on-board generation of the vehicle operation model 240, off-board generation of the vehicle operation model 240, or a combination thereof. In an example of on-board generation of the vehicle operation model 240, the first control unit 312 and the first storage unit 314 can be implemented to generate the vehicle operation model 240 on the first device 102. In this example, the vehicle operation model 240 can be generated primarily or solely based on the recorded vehicle operation information 446 for the vehicle occupant of the user vehicle 210.

In the example of off-board generation of the vehicle operation model 240, the second control unit 334 of FIG. 3 and the second storage unit 346 of FIG. 3 can receive the recorded vehicle operation information 446 from the first device 102 to generate the vehicle operation model 240 on the second device 106. In this example, the vehicle operation model 240 can be generated primarily based on the recorded vehicle operation information 446 for the vehicle occupant of the user vehicle 210 or in combination with external information, such as the vehicle operation pattern 454 of different vehicle operators.

In the example of the combination of on-board and off-board generation of the vehicle operation model 240, the computing system 100 can partition the calculation of the various aspects of the vehicle operation model 240 between the first device 102 and the second device 106.

The control flow can pass from the operation pattern module 412 to the measure modification module 414. The modification factor module 416 is for calculating the modified model input 242. The measure modification module 414 can calculate the modified model input 242 with an operation measurement modification factor 460.

The operation measurement modification factor 460 is a factor that modifies the current vehicle operation measures 230 of the user vehicle 210 to operation patterns or behaviors of the vehicle occupant. For example, the operation measurement modification factor 460 can adjust the current vehicle operation measures 230 to reflect a value for the essential vehicle control functions 224 that would be generated from operation by the vehicle occupant in the manual vehicle operation state 430.

The measure modification module 414 can calculate the operation measure modification factor 460 with a modification factor module 416 based on the vehicle operation profile 450 and a restriction factor 462. The restriction factor 462 is a limitation on inputs into an autonomous driving system. For example, the restriction factor 462 can be a legal limit, such as a speed limit or lane boundary, or a limitation based on safety. An example of the restriction factor 462 based on safety can be a value determined based on the vehicle environmental information 440, the geographic information 442, travel context 444, or a combination thereof. As a specific example, in the situation where the vehicle environmental information 440 indicates that the roads are wet or icy, the restriction factor 462 can be a limitation on the vehicle speed or rate of acceleration to prevent loss of tire traction.

The modification factor module 416 can calculate the operation measure modification factor 460 in a number of ways. In an implementation, the operation measurement modification factor 460 can be calculated as a ratio between an operation value of the vehicle operation model 240 and the restriction factor 462. As a specific example, in the situation of driving on a highway, the vehicle operation model 240 associated with a specific instance of the vehicle operation profile 450 can include the vehicle operation pattern 454 for highway driving at 75 MPH with the user vehicle 210. To continue the specific example, the restriction factor 462 can be a posted speed limit of 65 MPH. In this specific example, the modification factor module 416 can calculate the operation measure modification factor 460 as a ratio between the vehicle operation model 240 vehicle operation speed of 75 MPH and the restriction factor 462 value of 65 MPH, which is approximately 1.15.

Based on the operation measure modification factor 460, the control flow can return to the measure modification module 414 to calculate the modified model input 242. For example, the measure modification module 414 can calculate the modified model input 242 by multiplying the current vehicle operation measures 230 with the operation measure modification factor 460. As a specific example, for the operation measurement modification factor 460 calculated as 1.15 for the operation speed of the user vehicle 210, in the situation where the current vehicle operation measures 230 for the vehicle speed is 60 MPH, the measure modification module 414 can calculate the modified model input 242 as the product of the vehicle speed of 60 PMH and the operation measurement modification factor 460 of 1.15, which is approximately 69 MPH.

The control flow can pass from the measure modification module 414 to the instruction generation module 418. The instruction generation module 418 is for generating the vehicle operation instructions 226. The instruction generation module 418 can generate the vehicle operation instructions 226 by applying the vehicle operation model 240 to the modified model input 242. More specifically, the instruction generation module 418 can generate the vehicle operation instructions 226 to control the essential vehicle control functions 224, including the throttling system 432, the steering system 434, the braking system 436, or a combination thereof, based on the modified model input 242 according to the vehicle operation model 240.

In the example of highway driving, the vehicle operation model 240 can include the vehicle speed of the user vehicle 210 at 75 MPH in an area with a posted speed limit of 65 MPH. To continue the example, a situation may arise where the current vehicle operation measures 230 for the vehicle speed is 60 MPH and the corresponding instance of the measure modification module 414 is calculated as approximately 69 MPH. In this situation, the instruction generation module 418 can generate the vehicle operation instructions 226 to operate the essential vehicle control functions 224 to generate acceleration of the user vehicle 210 according to the vehicle operation model 240 until the current vehicle operation measures 230 of vehicle speed reaches 65 MPH and the modified model input 242 reaches 75 MPH.

The instruction generation module 418 can provide the vehicle operation instructions 226 to the autonomous vehicle operation system 220 of FIG. 2. For example, the instruction generation module 418 can implement the first control interface 322 of FIG. 3 or the first communication unit 316 to provide the vehicle operation instructions 226 to the autonomous vehicle operation system 220 for operating the essential vehicle control functions 224.

It has been discovered that the computing system 100 provides improved operation safety of the user vehicle 210. Generating the vehicle operation model 240 to emulate the driving behavior and patterns of the vehicle occupant facilitates situations where the vehicle occupant is required to take over the essential vehicle control functions 224 from the autonomous vehicle operation system 220, thereby improving safe operation of the user vehicle 210.

The computing system 100 has been described with module functions or order as an example. The computing system 100 can partition the modules differently or order the modules differently. For example, the operation monitor module 410 can be coupled to the measure modification module 416.

The modules described in this application can be hardware implementation or hardware accelerators in the first control unit 312 of FIG. 3 or in the second control unit 334 of FIG. 3. The modules can also be hardware implementation or hardware accelerators within the first device 102 or the second device 106 but outside of the first control unit 312 or the second control unit 334, respectively, as depicted in FIG. 3. However, it is understood that the first control unit 312, the second control unit 334, or a combination thereof can collectively refer to all hardware accelerators for the modules.

The modules described in this application can be implemented as instructions stored on a non-transitory computer readable medium to be executed by a first control unit 312, the second control unit 334, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The physical transformation from generating the vehicle operation instructions 226 based on the vehicle operation model 240 results in the movement in the physical world, such as autonomous operation of the user vehicle 210. Movement in the physical world, such changes in the operation of the essential vehicle control functions 224, results in changes to the movement of the user vehicle 210 by the autonomous vehicle operation system 220.

Figure 5:
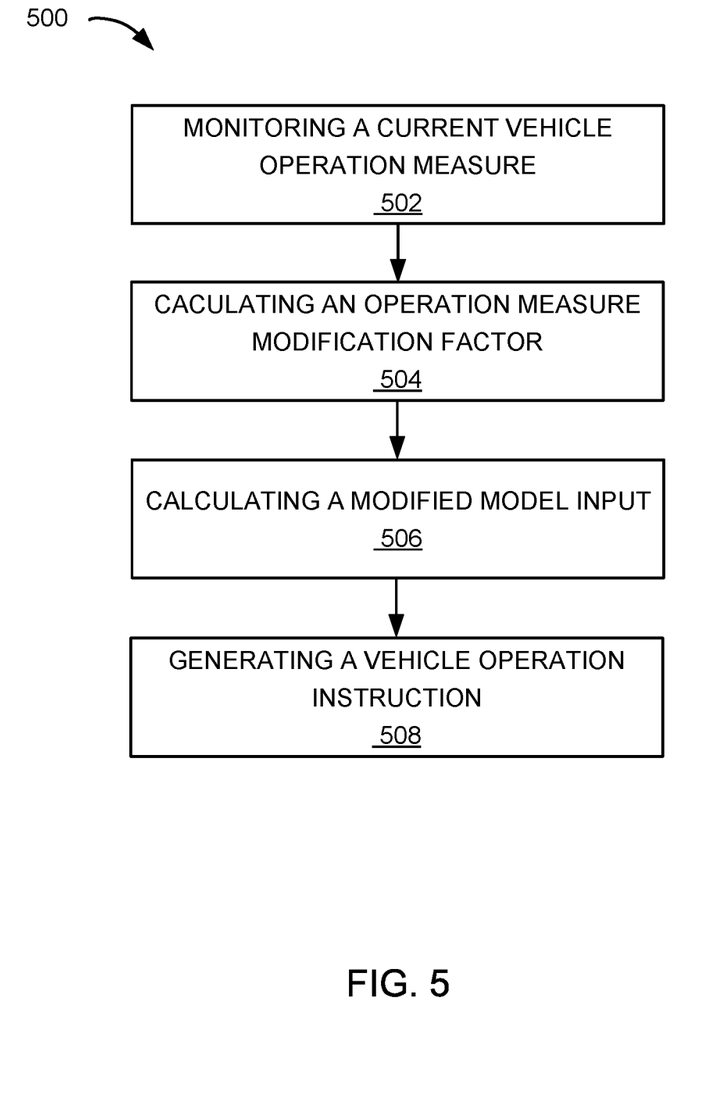
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: monitoring a current vehicle operation measure for an essential vehicle control function of a user vehicle in an autonomous vehicle operation state in a block 502; calculating an operation measure modification factor based on a vehicle operation profile of the user vehicle in a block 504; calculating a modified model input from the current vehicle operation measure based on the operation measure modification factor in a block 506; and generating a vehicle operation instruction, with the modified model input, for the essential vehicle operation functions according to a vehicle operation model to operate the essential vehicle control functions of the user vehicle in the autonomous vehicle operation state in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit configured to:
monitor a current vehicle operation measure for an essential vehicle control function of a user vehicle in an autonomous vehicle operation state;
calculate an operation measure modification factor based on a vehicle operation profile, of the user vehicle, and a restriction factor including the number of passengers, loading of cargo, and tire pressure in the user vehicle;
calculate a modified model input from the current vehicle operation measure based on the operation measure modification factor;
generate a vehicle operation instruction, with the modified model input, for the essential vehicle control function according to a vehicle operation model to operate the essential vehicle control function of the user vehicle in the autonomous vehicle operation state;
a communication unit, coupled to the control unit, configured to provide the vehicle operation instruction to an autonomous vehicle operation system; and
a user interface, coupled to the control unit, configured to display the vehicle operation instruction.

2. The system as claimed in claim 1 wherein the control unit is configured to calculate the operation measure modification factor based on the restriction factor including a fuel level.

3. The system as claimed in claim 1 wherein the control unit is configured to generate the vehicle operation model based on a vehicle operation pattern.

4. The system as claimed in claim 1 wherein the control unit is configured to generate the vehicle operation model based on a supplemental operation pattern.

5. The system as claimed in claim 1 wherein the control unit is configured to generate the vehicle operation profile based on a recorded vehicle operation information recorded in a manual vehicle operation state of the user vehicle.

6. The system as claimed in claim 1 wherein the control unit is configured to generate the vehicle operation profile to include operation of a non-essential vehicle function.

7. The system as claimed in claim 1 wherein the control unit is configured to generate the vehicle operation instruction including operation of the essential vehicle control function, including a steering system, a throttle system, a braking system, or a combination thereof of the user vehicle.

8. A method of operation of a computing system comprising:
monitoring a current vehicle operation measure for an essential vehicle control function of a user vehicle in an autonomous vehicle operation state;
calculating an operation measure modification factor based on a vehicle operation profile, of the user vehicle, and a restriction factor including the number of passengers, loading of cargo, and tire pressure in the user vehicle;
calculating a modified model input from the current vehicle operation measure based on the operation measure modification factor;
generating a vehicle operation instruction, with the modified model input, for the essential vehicle control function according to a vehicle operation model to operate the essential vehicle control function of the user vehicle in the autonomous vehicle operation state; and
displaying the vehicle operation instruction on a user interface.

9. The method as claimed in claim 8 further comprising calculating the operation measure modification factor based on the restriction factor including a fuel level.

10. The method as claimed in claim 8 further comprising generating the vehicle operation model based on a vehicle operation pattern.

11. The method as claimed in claim 8 further comprising generating the vehicle operation model based on a supplemental operation pattern.

12. The method as claimed in claim 8 further comprising generating the vehicle operation profile based on a recorded vehicle operation information recorded in a manual vehicle operation state of the user vehicle.

13. The method as claimed in claim 8 further comprising generating the vehicle operation profile to include operation of a non-essential vehicle function.

14. The method as claimed in claim 8 wherein generating the vehicle operation instruction includes operation of the essential vehicle control function, including a steering system, a throttle system, a braking system, or a combination thereof of the user vehicle.

15. A non-transitory computer readable medium including instructions executable by a control circuit for a computing system, the instructions comprising:
monitoring a current vehicle operation measure for an essential vehicle control function of a user vehicle in an autonomous vehicle operation state;
calculating an operation measure modification factor based on a vehicle operation profile, of the user vehicle, and a restriction factor including the number of passengers, loading of cargo, and tire pressure in the user vehicle;
calculating a modified model input from the current vehicle operation measure based on the operation measure modification factor;
generating a vehicle operation instruction, with the modified model input, for the essential vehicle control function according to a vehicle operation model to operate the essential vehicle control function of the user vehicle in the autonomous vehicle operation state; and
displaying the vehicle operation instruction on a user interface.

16. The non-transitory computer readable medium as claimed in claim 15, further comprising calculating the operation measure modification factor based on the restriction factor including a fuel level.

17. The non-transitory computer readable medium as claimed in claim 15, further comprising generating the vehicle operation model based on a vehicle operation pattern.

18. The non-transitory computer readable medium as claimed in claim 15, further comprising generating the vehicle operation model based on a supplemental operation pattern.

19. The non-transitory computer readable medium as claimed in claim 15, further comprising generating the vehicle operation profile based on a recorded vehicle operation information recorded in a manual vehicle operation state of the user vehicle.

20. The non-transitory computer readable medium as claimed in claim 15, further comprising generating the vehicle operation profile to include operation of a non-essential vehicle function.

* * * * *